July 31, 1962 R. K. MOSHER ET AL 3,047,856
RADAR GUIDANCE TECHNIQUES
Filed April 14, 1958 2 Sheets-Sheet 1

INVENTORS
RICHARD K. MOSHER
ALBERT B. WIGHT

BY *Fred Jacob*

ATTORNEY

INVENTORS
RICHARD K. MOSHER
ALBERT B. WIGHT

BY *Fred Jacob*

ATTORNEY

United States Patent Office 3,047,856
Patented July 31, 1962

3,047,856
RADAR GUIDANCE TECHNIQUES
Richard K. Mosher, Cochituate, and Albert B. Wight, Quincy, Mass., assignors to Laboratory for Electronics, Inc., Boston, Mass., a corporation of Delaware
Filed Apr. 14, 1958, Ser. No. 728,232
14 Claims. (Cl. 343—5)

The present invention relates in general to tactical radar systems, in particular to relatively low cost, compact and transportable ground controlled approach radar systems continuously operable as an air surveillance radar and as a precision approach radar, wherein cost, weight and space are kept to a minimum by the sharing of essential components in the performance of both functions.

Broadly speaking, a precision approach radar (PAR) associated with a ground controlled approach (GCA) system functioning as a low-visibility aircraft landing aid finds its greatest utility under conditions when the overcast ceiling is at 1000 feet or less, such that a visual landing approach is not feasible. It consists of a radar arranged to scan intersecting horizontal and vertical sectors in a selected volume of space. By the use of appropriate electronic circuitry, the elevation antenna displays the range of an aircraft under observation and its relationship to a predetermined course line known as the glide slope. In a corresponding manner the azimuth antenna provides an indication of the range and left-right deviation of the aircraft from the course defined by an extension of the runway center line which is known as the landing approach path. Details of a precision approach radar system and the manner of sighting and use applicable to the present system are found in a co-pending application of Addison D. Cole et al., Serial No. 487,372, filed February 10, 1955, entitled Radar Guidance Apparatus.

An air surveillance radar (ASR) utilizes a continuously rotating azimuth antenna and associated electronic circuitry to indicate the position of aircraft within a region centered about the same antenna. Ordinarily, the ASR establishes the initial radar contact with inbound aircraft. Vectoring instructions are relayed to the aircraft to guide its movement into the relatively small volume of space covered by PAR.

In order to have complete airport coverage, a GCA system must combine both the PAR and the ASR functions. For military purposes, it is desirable that apparatus combining these functions conform to certain tactical requirements wherein the relative ease with which frequent changes of location can be carried out is important. A tactical GCA system which meets this problem is disclosed in a co-pending application of Addison D. Cole et al., entitled Radar Aircraft Guidance System, Serial No. 563,588, filed February 6, 1956, now U.S. Patent No. 3,007,151, granted October 31, 1961. The apparatus disclosed therein comprises an azimuth antenna an an elevation antenna mounted in a common pedestal, both energized from a common source of microwave power and provides means for selecting the desired mode of operation. When the system is in the ASR mode, the azimuth antenna rotates continuously to scan a 360° sector, while the elevation antenna is inactive. Upon selecting the PAR mode, both the azimuth and the elevation antenna oscillate about their respective axes to scan the aforesaid selected volume of space which contains the landing approach path of the aircraft.

While a system of the type referred to above is satisfactory for certain types of airport operation, it presents problems when the traffic handling capacity of a landing strip under its control is taxed to the limit by aircraft waiting to be landed. This is particularly true in the case of jet aircraft. In view of the fact that the system operates only in the mode selected, i.e. either in the surveillance or precision approach mode, radar control of aircraft waiting outside the aforesaid selected volume of space cannot be maintained while an aircraft is landed under PAR control. Accordingly, the waiting aircraft must be stacked to fly a holding pattern, usually by means of a marker beacon. In the case of jet aircraft, the holding operation proves to be costly in view of the inherent jet speed which requires a large holding pattern with resultant large fuel consumption. Some fuel economy is achieved by stacking jet aircraft at high altitudes. However, additional time is required to reach the landing approach path which results in decreasing the traffic handling capacity of the air strip.

Accordingly, it is a primary object of this invention to provide a radar system which overcomes the foregoing disadvantages.

It is another object of this invention to provide a tactical radar system wherein the surveillance and precision approach functions are carried out simultaneously.

It is a further object of this invention to provide a tactical GCA radar system having azimuth and elevation antennas respectively, said azimuth antenna being actuated to scan a 360° angle at a non-uniform angular velocity such that the maximum effective radar range is obtained in a region which includes the landing approach path, the elevation antenna being actuated simultaneously to scan a sector whose intersection with the aforesaid region defines a selected volume of space substantially centered about the landing approach path.

These and other novel features of the invention together with further objects and advantages thereof will become more apparent from the following detailed specification with reference to the accompanying drawings in which.

Figure 1:
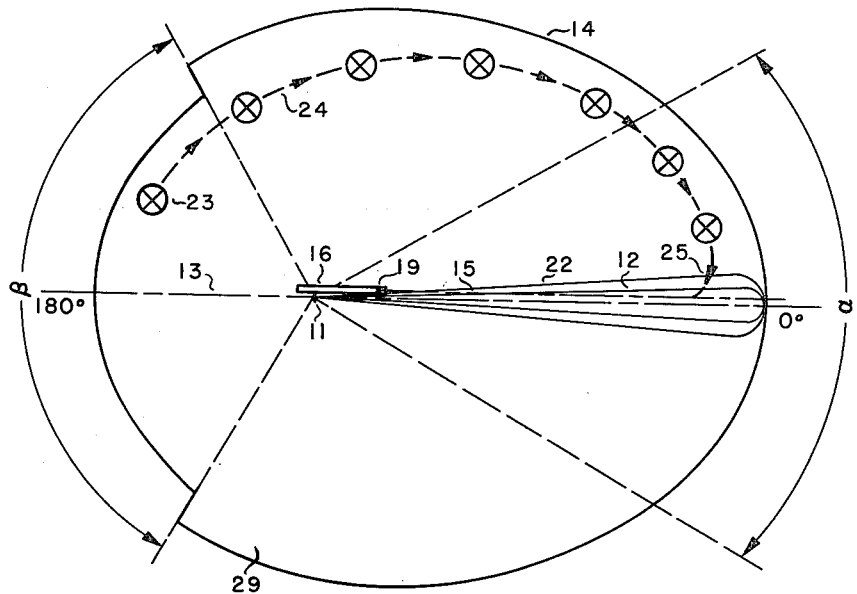
FIG. 1 is a birdseye view of the effective range pattern of the radar system which constitutes the subject matter of the present invention.

The tactical GCA system which forms the subject matter of the present invention comprises an azimuth and an elevation antenna, a common source of motive power and a common source of microwave power for energizing both antennas. The azimuth antenna rotates continuously about a vertical axis to scan a large sector and provide ASR coverage of the latter. The elevation antenna simultaneously oscillates through a restricted angle about a horizontal axis and is energized to scan a vertical sector whose intersection with the aforesaid large sector defines a selected volume of space substantially centered about the landing approach path. The information derived from both antennas by scanning the aforesaid selected volume of space provides PAR coverage of the latter.

In order to maintain adequate ASR control over all aircraft within the effective radar range of the azimuth beam, the information rate, which is defined as the number of looks at the target per second, must be greater than a predetermined minimum value. Stated differently, the motion of a target can be noted adequately only if a sufficient number of discrete observations are made during a given time interval. Specifically, in the radar system which forms the subject matter of the present invention, the scan rate of the azimuth antenna, i.e. its angular velocity, must be sufficiently high to obtain the required information rate in a 360° sector.

The effective radar beam range can be defined as follows:

$$\text{Range} \propto \frac{\text{target hits}}{bw} \propto \frac{prf \times bw}{\text{scan rate}}$$

where $prf$=pulse repetition frequency, and $bw$=beam width.

If $prf$ and $bw$ remain constant, range is proportional to the number of target hits of the radar beam. This may be explained by the fact that the ultimate signal-to-noise ratio depends on integration either by visual means, cathode ray tube means, or otherwise, of the information obtained. The greater the number of target hits obtained, the larger the signal-to-noise ratio and, hence, the greater the effective beam range. Since hits are inversely proportional to the scan rate, beam range is similarly an inverse function of the scan rate. In order to maintain adequate control over landing aircraft, the PAR range must be sufficiently large to permit the aircraft to make positional corrections prior to touchdown. As a result, a low scan rate is required of the azimuth antenna beam while traversing the aforesaid selected volume of space.

The radar system which forms the subject matter of the present invention fulfills the above requirements of high ASR information rate in a 360° sector, and large PAR range in a selected volume, by scanning the 360° azimuth sector at a non-uniform angular velocity, the average scan rate being sufficiently high to obtain an adequate information rate for the entire sector at an azimuth beam range in excess of a predetermined minimum range. The lowest scan rate occurs in the region of the aforesaid selected volume of space with the result that maximum azimuth range is obtained in this region. The highest scan rate, and consequently minimum azimuth range, occurs in a region substantially centered about a line displaced 180° from the landing approach path. Of all areas scanned, the latter region of minimum azimuth range, being located substantially opposite of the landing approach path, has the smallest utility for landing strip operation. The azimuth beam range in this region is further decreased as a result of energizing the continuously oscillating elevation antenna from the common source of microwave power during the interval when the azimuth antenna traverses said region. As a result, microwave power which is ordinarily applied to the azimuth antenna, is diverted to the elevation antenna and hence, the azimuth range, which is a function of the applied microwave power, is reduced.

With reference now to FIG. 1, the effective beam range patterns available with the radar system which forms the subject matter of the present invention are illustrated relative to the landing strip serviced by the system. For the sake of clarity, the relative dimensions are not drawn to scale. Azimuth antenna 11 radiates a beam 12 while continuously rotating through a 360° angle about a vertical axis, i.e. an axis normal to the plane of the paper. The effective range of beam 12 at any point of the 360° rotation of azimuth antenna 11, is represented by the distance from the antenna to envelope 14 and is seen to vary during a complete antenna revolution. As explained above, this variation in range is due to a non-uniform scan rate, i.e. antenna rotation at a non-uniform angular velocity. The latter is lowest in the region of angle $\alpha$ and hence maximum beam range occurs in this region. Antenna 11 is seen to be located adjacent landing strip 16. Line 13 indicates the 0° and 180° positions of the 360° angle through which the azimuth antenna rotates. Line 15, which is parallel to line 13, represents the landing approach path of an aircraft relative to landing strip 16 and terminates in touchdown point 19. The relative distances between lines 13, 15 and antenna 11 are seen to be such that angle $\alpha$, the region of maximum azimuth range, is substantially centered about the landing approach path. The elevation antenna, which for purposes of illustration herein may be considered to occupy the same location as azimuth antenna 11, radiates a beam 22 which scans a vertical sector as a result of elevation antenna oscillation about a horizontal axis, i.e. about an axis parallel to the plane of the paper. It will be noted that the vertical sector so scanned intersects a portion of angle $\alpha$ to define the aforesaid predetermined volume of space which is under PAR control. In order to follow landing aircraft to the touchdown point, the elevation antenna is capable of being slewed about a vertical axis, as required during the landing operation. Stations 23 along flight path 24 represent successive positions of one or more aircraft under ASR control prior to entering landing approach path 15. It will be understood that the flight path may take any form desired and may continue into region 29 of the azimuth beam pattern. Alternatively, a number of flight paths may exist, e.g. arranged symmetrically about line 13.

The range of beam 12 is seen to be smallest in the region of angle $\beta$ which is substantially centered about the extension of the landing approach path. In this region, the azimuth antenna reaches its maximum angular velocity or scan rate with a resultant decrease in azimuth range. Additionally, the azimuth range suffers a step decrease in this region. The latter is due to the switching of a portion of the microwave power to the elevation antenna to energize the latter, said power being derived from a common microwave power source and being normally supplied entirely to the azimuth antenna. Since, as explained hereinabove, the region of angle $\beta$ has the smallest utility in the instant operation, this area is chosen for the step decrease in azimuth range which is necessitated by the energization of the elevation antenna from the common microwave power source. In one embodiment of the invention, the available microwave power is shared equally by both antennas during this period. Since range is a function of the fourth root of the applied power, a step decrease of $\frac{1}{2}^{1/4}$ will occur. All other factors remaining equal, elevation beam 22, in this case, will have a range somewhat smaller than that of the azimuth beam while the latter is traversing angle $\alpha$, the region of maximum range. However, due to the greater gain of the elevation antenna and the lower scan rate of the latter, its effective beam range of about twenty-one miles is comparable to an azimuth beam range of about twenty-five miles. Alternatively, either a larger fraction of the power or the total available microwave power may be switched to the elevation antenna while the azimuth antenna rotates through angle $\beta$. In the latter case, no coverage whatever is obtained in the region of angle $\beta$ and the range of elevation beam 22 is extended. The embodiment chosen will at all times conform to the particular operational requirements, so that a sufficiently large portion of the landing approach path is covered by PAR to permit positional corrections of the landing aircraft prior to touchdown.

Figure 2:
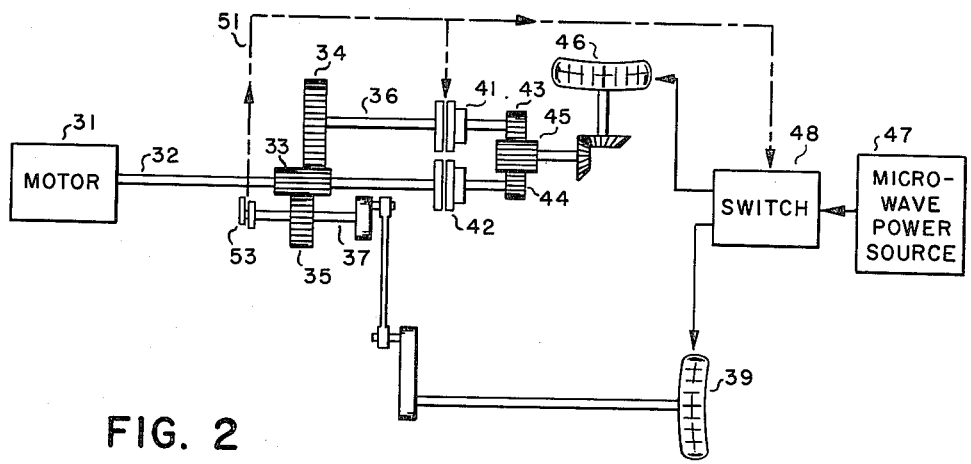
FIG. 2 illustrates one embodiment of apparatus for actuating the antennas in the desired manner.

FIG. 2 illustrates schematically one embodiment for mechanically implementing the system which will produce the antenna range patterns illustrated in FIG. 1. A common drive motor 31 drives shaft 32 at a fixed angular velocity, e.g. at 60 r.p.m. The ratios of gears 34 and 35 respectively relative to gear 33 is such that shafts 36 and 37 rotate at 20 r.p.m. and 40 r.p.m. respectively. The mechanical power of shaft 37 is transferred by means of appropriate cranks to elevation antenna 39 to produce a continuous oscillating motion of the latter. Shaft 36 is adapted to transmit mechanical power to gear 43 via clutch 41, while clutch 42 is adapted to transfer the power of shaft 32 directly to gear 44. Both gears 43 and 44 engage a gear 45 to transmit rotary motion to azimuth antenna 46. Both antennas are energized electrically from a source of microwave power 47, such energization being controlled by switch 48. As indicated schematically by dotted line 51, a set of timing cams 53, operated from shaft 37, controls the operation of switch 48 and determines which antenna is energized during different portions of the operational cycle of the elevation antenna. Additionally, the timing cams govern the engagement of one of clutches 41 and 42, thereby controlling the angular velocity of the azimuth antenna and coordinating the motion of both antennas.

The clutches may take different forms, such as magnetic clutches, conventional combinations of planetary gears and brake bands, etc. Alternatively, variable-speed gearing may be employed. Assuming that the driving torque available from the drive motor is controlled by either the characteristics of the motor itself or by a device such as a slipping clutch set to a suitable slipping torque, the acceleration or deceleration of the azimuth antenna upon the energization of brake bands, engagement of clutches, etc., will be determined by the inertia of the antenna and by the drive torque referred to above; these factors can be chosen so as to give any desired acceleration or deceleration to insure a smooth transition between different angular velocities. Alternatively, the characteristics of the brakes and/or the clutches themselves can be chosen with reference to the antenna's inertia to control the acceleration.

Figure 3:
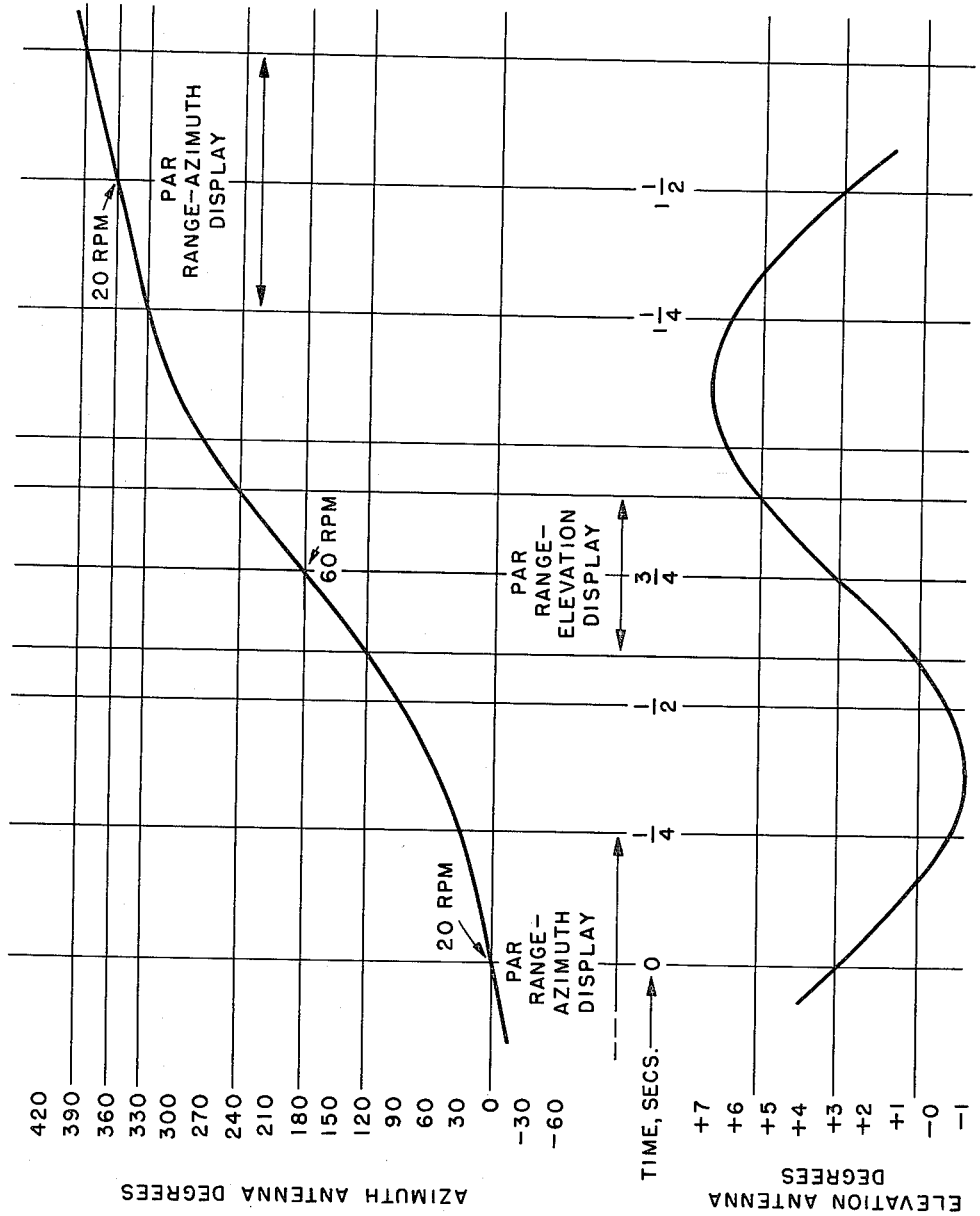
FIG. 3 illustrates the simultaneous motion of the azimuth and elevation antennas.

FIG. 4 is a plot of antenna motion against time, the slope at any point of the plotted lines being representative of the angular velocity. The 0° and 180° points on the ordinate of the azimuth antenna plot represent the corresponding points of FIG. 1. As an example, a 1½ second operational cycle is illustrated. It will be noted that in the region of PAR range azimuth display the angular velocity of the azimuth antenna is approximately 20 r.p.m., while the angular velocity in the PAR range elevation display is roughly 60 r.p.m. The resultant mean angular velocity of the azimuth antenna is then 40 r.p.m. which is sufficiently large to provide adequate ASR control, as explained hereinabove. As shown in FIG. 3 and noted previously, the transition between different angular velocities, i.e., the operation when one of clutches 41 and 42 is engaged and the other is disengaged, is a smooth one due to the inherent inertia of the entire system.

The elevation antenna is seen to oscillate once in each direction during a complete cycle about a central position at +3° above the horizontal. The central position chosen is, of course, subject to the particular operational requirements of the landing strip. As shown in FIG. 3, energization of the elevation antenna occurs during the period of maximum angular velocity of the azimuth antenna, i.e. while the azimuth antenna traverses angle β, the region of minimum range.

In operation, an aircraft coming in for a landing may start at position 23 (FIG. 1) and follow flight path 24 solely under ASR control of the azimuth beam to landing approach path 15. At point 25 the aircraft enters the sector scanned by the elevation antenna and is completely under PAR control from that point on. It will be understood that the various plane positions indicated by crossed circles along flight path 24 may also represent separate planes lined up for a landing. Similarly, an equal group of planes may be ranged in the opposite half 29 of the azimuth beam pattern, planes being landed alternately from the two halves. Alternatively, respective planes may follow individual flight paths under ASR control which lead into landing approach path 15.

The advantages of the tactical GCA system described above are manifest: Since aircraft awaiting landing orders at a landing strip need not be stacked, an important fuel saving is effected. Instead of flying a holding pattern at different altitude levels and finally peeling off to enter the flight path which ultimately takes the aircraft into the landing approach path, the increased traffic handling capacity of the technique which forms the subject matter of the present invention permits planes to enter the aforesaid flight path at once. Additionally, greater safety is obtained since all aircraft within the ASR range of the rotating azimuth beam are continuously under observation. Finally, since the two antennas are mounted on the same pedestal and use a common source of microwave power, the tactical aspects of the GCA system disclosed herein are retained.

Having thus described the invention, it will be apparent that numerous modifications and departures, as explained above, may now be made by those skilled in the art, all of which fall within the scope contemplated by the invention. Consequently, the invention herein disclosed is to be construed as limited only by the spirit and scope of the appended claims.

What is claimed is:

1. In a radar system, a first beam radiating antenna adapted to scan a first sector, means for non-uniformly rotating said first antenna about an axis to provide a region of minimum angular velocity during each complete revolution, a second beam radiating antenna adapted to scan a second sector, and means for rotating said second antenna about an axis such that said second sector intersects said first sector substantially at said region of minimum angular velocity.

2. In a radar system, first signal receiving means for traversing an angle at a non-uniform rate about a first axis to scan a relatively large sector having a region of maximum beam range, second signal receiving means for traversing an angle about a second axis to scan a relatively small sector, said first and second axes being mutually angularly disposed such that said relatively small sector intersects said relatively large sector substantially in said region of maximum beam range.

3. In a radar system having first and second beam radiating antennas, means for continuously rotating said first antenna at a non-uniform rate about a first axis to scan a relatively large sector containing a region of minimum angular velocity, and means for oscillating said second antenna about a second axis substantially orthogonally disposed to said first axis to scan a relatively small sector which intersects said relatively large sector substantially in said region of minimum angular velocity.

4. In a radar system, a first beam radiating antenna adapted to rotate about a first axis to scan a relatively large sector, means for actuating said first antenna to vary the effective radar beam range during said scan to provide a region of maximum range in said relatively large sector, a second beam radiating antenna adapted to rotate about a second axis to scan a relatively small sector, said axes being orthogonally disposed with respect to each other such that said relatively small sector intersects said relatively large sector substantially in said region of maximum beam range to define a predetermined volume of space.

5. In a radar system, a first beam radiating antenna adapted to rotate continuously about a first axis through a 360° angle, means for actuating said first antenna to scan at maximum and minimum effective radar beam range in respective oppositely disposed regions of said 360° angle, a second team radiating antenna adapted to oscillate through a relatively small angle about a second axis substantially orthogonal to said first axis, and means for actuating said second antenna to scan said relatively small angle while said first antenna is in said minimum effective beam range region.

6. In a radar system having beam radiating azimuth and elevation antennas, means including said azimuth antenna for scanning a relatively large azimuth sector at a non-uniform angular velocity in order to vary the effective azimuth beam range, and means including said elevation antenna for scanning a relatively small elevation sector which intersects the region of maximum range of said azimuth sector to define a predetermined volume of space.

7. The apparatus of claim 6 and further comprising a source of microwave power, means for energizing respective antennas from said source, and means for diverting microwave power in favor of said elevation antenna while said azimuth antenna is scanning the region of minimum azimuth sector range.

8. In a radar system, a beam radiating azimuth antenna adapted to rotate continuously about a first axis through a 360° angle, means for rotating said azimuth antenna at a non-uniform rate to provide regions of minimum and maximum angular velocity, respective regions of minimum and maximum angular velocity being centered substantially about the 0° and 180° positions of said 360° angle, said azimuth antenna scanning an azimuth sector having regions of maximum and minimum effective beam range coextensive with said regions of minimum and maximum angular velocity respectively, a beam radiating elevation antenna adapted to oscillate about a second axis to scan an elevation sector, said axes being positioned orthogonally relative to each other such that said elevation sector intersects said azimuth sector substantially in said region of maximum effective beam range.

9. The apparatus of claim 8 and further comprising a common source of microwave power, means for normally coupling said microwave power to said azimuth antenna, and control means operative to divert at least a portion of said microwave power to energize said elevation antenna while said azimuth antenna is scanning said region of minimum effective beam range.

10. The apparatus of claim 9 wherein said portion of microwave power comprises 100%.

11. The apparatus of claim 9 wherein said portion of microwave power comprises 50%.

12. The apparatus of claim 8 wherein the means for actuating said antennas about their respective axes comprise a source of motive power, crank means permanently coupling said motive power source to said elevation antenna to impart oscillatory motion to the latter, first and second clutch means adapted to couple said motive power source to said azimuth antenna to impart continuous rotary motion to the latter at said minimum or maximum angular velocity respectively, said control means comprising timing cams coupled to said motive power source, said timing cams alternately engaging said first or second clutch means during each revolution of said azimuth antenna.

13. In a radar system, a beam radiating antenna mounted for 360° rotation about an axis, means for actuating the antenna at a non-uniform rate about its axis such that minimum and maximum angular velocities respectively occur substantially at opposite points of each revolution, means for energizing the antenna with microwave power, and means for diverting at least a portion of the microwave power while the antenna rotates through a region centered about the point of maximum angular velocity.

14. In a radar system, a beam radiating antenna adapted to be energized with microwave power, means for continuously rotating the antenna about an axis to scan through a full circle, the circular scan including first and second sectors centered about diametrically opposite points, means for controlling the antenna's rotation to provide minimum and maximum angular velocities of the antenna in the first and second sectors respectively, the minimum angular velocity providing PAR control in the first sector at a predetermined maximum beam range, the mean of the minimum and maximum angular velocities providing ASR control outside of the first sector at a range in excess of a minimum range occurring in the second sector, and means for diverting a portion of the microwave power from the antenna while the latter traverses the second sector.

References Cited in the file of this patent

UNITED STATES PATENTS

| | | |
|---|---|---|
| 2,442,695 | Koch | June 1, 1948 |
| 2,552,566 | Levine | May 15, 1951 |
| 2,849,710 | Wade | Aug. 26, 1958 |

UNITED STATES PATENT OFFICE
CERTIFICATE OF CORRECTION

Patent No. 3,047,856

July 31, 1962

Richard K. Mosher et al.

It is hereby certified that error appears in the above numbered patent requiring correction and that the said Letters Patent should read as corrected below.

Column 1, line 58, for "an", first occurrence, read -- and --; same line 58, for "in" read -- on --; column 4, line 8, after "elevation" strike out the comma; column 5, line 23, for "FIG. 4" read -- FIG. 3 --; line 32, for "r.p.m" read -- r.p.m. --; column 6, line 56, for "team" read -- beam --.

Signed and sealed this 20th day of November 1962.

(SEAL)
Attest:

ERNEST W. SWIDER
Attesting Officer

DAVID L. LADD
Commissioner of Patents